US007262772B2

(12) United States Patent
Ebert (10) Patent No.: US 7,262,772 B2
(45) Date of Patent: Aug. 28, 2007

(54) VISUAL CONTENT SUMMARY

(75) Inventor: Peter S. Ebert, Menlo Park, CA (US)

(73) Assignee: SAP Aktiengesellschaft, Walldorf (DE)

( * ) Notice: Subject to any disclaimer, the term of this patent is extended or adjusted under 35 U.S.C. 154(b) by 461 days.

(21) Appl. No.: 10/393,356

(22) Filed: Mar. 21, 2003

(65) Prior Publication Data

US 2004/0183815 A1    Sep. 23, 2004

(51) Int. Cl.
*G06T 11/20* (2006.01)
*G06F 3/00* (2006.01)

(52) U.S. Cl. ............... 345/440; 345/440.2; 715/764

(58) Field of Classification Search ........... 345/440, 345/441, 440.2; 715/764
See application file for complete search history.

(56) References Cited

U.S. PATENT DOCUMENTS

| 5,442,740 | A * | 8/1995 | Parikh ................. 345/440 |
| 6,041,331 | A | 3/2000 | Weiner et al. |
| 6,058,277 | A * | 5/2000 | Streefkerk et al. ........ 399/81 |
| 6,094,648 | A * | 7/2000 | Aalbersberg ............ 707/3 |
| 6,181,342 | B1 * | 1/2001 | Niblack ................ 345/635 |
| 6,236,395 | B1 * | 5/2001 | Sezan et al. ............ 715/723 |
| 6,271,840 | B1 * | 8/2001 | Finseth et al. ........... 715/513 |
| 6,356,908 | B1 * | 3/2002 | Brown et al. ............. 707/10 |
| 6,457,026 | B1 | 9/2002 | Graham et al. |
| 6,646,549 | B2 * | 11/2003 | Dawson ................. 340/531 |
| 2002/0059584 | A1 * | 5/2002 | Ferman et al. ........... 725/34 |
| 2002/0122063 | A1 * | 9/2002 | Weinberg et al. ........ 345/764 |

OTHER PUBLICATIONS

Boguraev, Branimir, et al., "Dynamic Presentation of Document Content for Rapid On-Line Skimming," AAAI Symposium on Intelligent Text Summarization, Mar. 23, 1998, XP002096508, 10 pgs.
Graham, Jarney, "The Reader's Helper: A Personalized Document Reading Environment," CHI '99 Conference Proceedings Human Factors in Computing Systems, Pittsburg, PA, May 15, 1999, XP000894254, pp. 481-488.

* cited by examiner

*Primary Examiner*—Ryan Yang
(74) *Attorney, Agent, or Firm*—Fish & Richardson P.C.

(57) ABSTRACT

Techniques are described for selecting and displaying specific content elements from within content of a media asset, such that the content elements may be displayed within a reserved portion of a user display, thereby providing a visual summary of the media asset content. The content elements may be provided along with a graphical representation of the content elements indicating, for example, their importance within the media asset relative to one another and/or to a user preference. In this way, the user may quickly and easily assess his or her level of interest in the media asset.

30 Claims, 7 Drawing Sheets

HP Shifts Software Strategy

Type: news

*Jennifer LeClaire*

As the post-merger decision-making process shifts into high gear, Hewlett-Packard (NYSE: HPQ - news ) (HP) on Monday announced a new software strategy designed to leverage its core assets. The technology titan will focus future development on extending three software suites: HP OpenView, HP Utility Data Center and HP OpenCall.

Company executives said the decision was based on HP's intellectual property and customer acceptance of these three products.

"HP has come full circle on its software strategy," Forrester Research ( Nasdaq: FORR - news ) analyst Joshua Walker told the E-Commerce Times, noting that the company has returned to its 1998 strategy, which spawned a middleware agreement with BEA Systems (Nasdaq: BEAS - news ).

"It is a practical approach to sticking to what they are good at -- application and systems management," Walker said.

TECHNOLOGY'S HOME PAGE
- HP Jumps on Mobile Flash Wagon
- HP Unifies Clustered Database Technologies
- HP Unveils Servers Based on New Chip

Web Services Focus

- Hewlett-Packard
- BEA Systems
- Microsoft
- IBM
- Forrester Research

VISUAL CONTENT SUMMARY

TECHNICAL FIELD

This description relates to providing a visual summary of content of a media asset on a user display.

BACKGROUND

Information is electronically presented to users of that information in a variety of ways. For example, a user may wish to view a document stored in an electronic format, such as a word processing document, a Portable Document Format (".pdf") document file, a Hypertext Markup Language ("HTML") document, or an Extensible Markup Language ("XML") document. Such documents may be electronically transferred between users, via, for example, electronic mail ("email") or the World Wide Web ("WWW"), or by some other type of computer network resources.

As another example, users often receive audio-visual information, in addition to (or as an alternative to) textual information. Such audio-visual information may be presented via a television or other display device, and may be formatted using an audio-visual format, such as the Moving Pictures Expert Group ("MPEG") format.

Often when a user is presented with such information, in the above or other formats, it is the case that the user is unsure of whether he or she should devote time to understanding the information in its entirety. For example, a user may receive a lengthy email, or access a large document as part of a web page. In other cases, even if the user definitely wishes to read the information in its entirety, time constraints may not allow a full reading.

SUMMARY

Implementations described below provide techniques for presenting summary information to a user, with respect to a particular document. When viewing some or all of a document, the user is also provided with a visual summary of the document, where the visual summary includes specific words or phrases from the document content, as well as a graphical representation indicating a relative importance of each portion of the visual summary.

In this way, the user may quickly ascertain whether a given document is of sufficient interest to warrant further reading or other use thereof, such as distribution to other interested users. Thus, the visual summary saves time and increases efficiency when a user is presented with a document.

According to one general aspect, a media asset is obtained, where the media asset includes content. Content-summarizing logic is applied to the content, to thereby select a plurality of summary elements from within the content. The media asset is displayed in a first portion of a user display, and the summary elements are displayed within a second portion of the user display.

Implementations may have one or more of the following features. For example, in applying content-summarizing logic to the content, words within the content may be compared to a pre-determined list of summary elements.

The summary elements may include individual discussion objects selected from the content, and the discussion objects may be individually classified in a pre-determined manner.

In displaying the summary elements, a graphical representation of the summary elements may be displayed with the summary elements, within the second portion of the user display. In this case, in associating the graphical representation, a bar graph may be associated with each of the summary elements, and a size of the bar graph may be increased in proportion to an importance of the bar graph's corresponding summary element. Alternatively, in associating the graphical representation, a portion of a pie graph may be associated with each of the summary elements, and a size of the portion may be increased in proportion to an importance of the portion's corresponding summary element. As another alternative, in associating a graphical representation, a colored object may be associated with each of the summary elements, and a color of the colored object may be altered in proportion to an importance of the colored object's corresponding summary element. As another alternative, in associating the graphical representation, a first preference-strength indicator may be associated with a first summary element using the graphical representation, where the first preference-strength indicator indicates a strength of a user's preference for the first summary element.

In applying content-summarizing logic to the content, a level of importance of each of the summary elements may be determined, and the level of importance of each element may be indicated within the second portion of the user display. In this case, in determining the level of importance, a frequency of appearance of the summary element within the content may be determined. Alternatively, in determining the level of importance, a prominence of appearance of the summary element within the content may be determined. Also alternatively, in indicating the level of importance, the summary elements may be displayed in order, according to their respective levels of importance.

Also alternatively, in applying content-summarizing logic to the content, user preference information may be accessed to determine a level of user preference of each of the summary elements, and the summary elements may be selected based on the user preference information.

In this case, in selecting the summary elements, a criteria other than the user preference information may be used. Also in this case, in applying content-summarizing logic to the content, the level of user preference and the level of importance into a selection value may be combined, and the summary elements may be ranked based on the selection value.

User preference information may be accessed to determine a relative level of importance of each of the summary elements to a user, and the summary elements may be selected based on the user preference information. In displaying the summary elements, a link may be provided from a first summary element displayed in the second portion of the user display to an appearance of the first summary element within the content within the first portion of the user display.

According to another general aspect, a user display system includes a first portion configured to display a media asset, the media asset including content, and a second portion configured to display summary elements selected from the content in accordance with content-summarizing logic.

Implementations may have one or more of the following features. For example, the content-summarizing logic may include rules for comparing words within the content to a pre-determined list of summary elements.

The summary elements may include individual discussion objects selected from the content, and the discussion objects may be individually classified in a pre-determined manner.

The second portion also may be operable to display a graphical representation of the summary elements. In this case, the content-summarizing logic may include rules for determining a level of importance of each of the summary elements, and indicating the level of importance of each element within the second portion of the user display.

According to another general aspect, an apparatus includes a storage medium having instructions stored thereon, and the instructions include a first code segment for partitioning a user display into a first portion and a second portion, a second code segment for displaying a media asset within the first portion, the media asset including content, a third code segment for selecting a group of individual elements from the content, and a fourth code segment for displaying the group of elements within the second portion.

Implementations may have one or more of the following features. For example, the third code segment may include a fifth code segment for comparing words within the content to a pre-determined list of individual elements. The individual elements may include individual discussion objects selected from the content, and the discussion objects may be individually classified in a predetermined manner.

The third code segment may include a fifth code segment for determining a first set of elements from within the content, and a sixth code segment for selecting the group of elements from among the first set of elements. In this case, the sixth code segment may select the group of elements based on a relative importance of each element within the group of elements to the content of the media asset.

The details of one or more implementations are set forth in the accompanying drawings and the description below. Other features will be apparent from the description and drawings, and from the claims.

DETAILED DESCRIPTION

Figure 1:
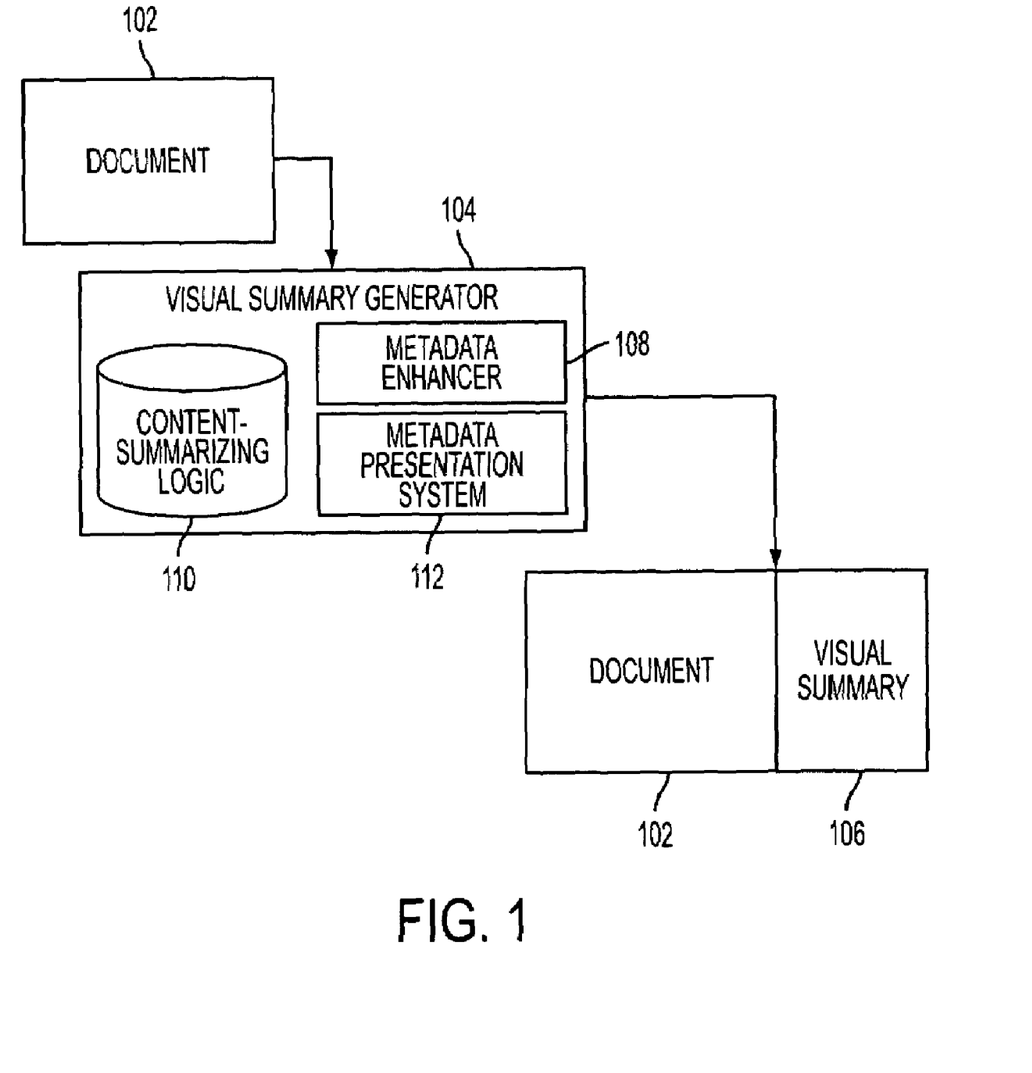
FIG. 1 is a block diagram of a system for generating a visual summary.

FIG. 1 is a block diagram of a system for generating a visual summary. In FIG. 1, a document 102 is to be presented to a user. The term "document" in this context generally refers to a discrete collection of information that may include content, as well as information about the content, as discussed in more detail below. Information about the content may include high-level attributes of the document, such as its author or general subject heading (for example, sports or weather). The information about the document also may include portions of the actual content itself, used to formulate the content metadata referred to above.

Thus, the term "document" is used herein to represent, for example, text, video, graphics, audio, music, or any other available rendering medium, or a combination of two or more of these media. Documents may be referred to by multiple terms, such as "articles," "media assets," or other similar terminology describing information to be passed on to a user. Documents may be presented to a user in virtually any manner of electronic formats associated with one or more of rendering media, such as a word processing document, an email message, a HTML page, or an XML message. A document, which generally refers to a document, a message, a file, or some other type of format, may contain the same piece of content in multiple forms, and may permit the generation of one type of content from another (for example, generation of audio content from textual content).

The content of a document may be obtained from virtually any source, for example, a publicly-available webpage (or portion thereof), an internal email, an individual's personal contact information, weather information, or a set of stock quotes. Content also may be obtained from specific applications such as a profit and loss report of a company, a printout of a sales order, or many other examples of discrete pieces of content to be made available to users. Documents may include files stored locally on the user's computer, such as office-productivity documents including word processing files, spreadsheets, or presentations. Documents also may be stored remotely, and accessed by the user over a computer network.

A visual summary generator 104 inputs the document 102 and outputs the document 102, along with a visual summary 106 of the document 102. As discussed in more detail below, the document 102 and visual summary 106 may be simultaneously but separately presented to the user, for example, in two corresponding sections of a user display.

The visual summary 106 may include specific elements of the content of the document 102. Such content elements, also referred to as summary elements, may be specific words or phrases selected from the content of the document, where the content elements have been selected by the visual summary generator 104. The content elements may be selected as being particularly important within a context of the document 102, that is, the content elements may be helpful in understanding a subject matter of the document content. Additionally, or alternatively, the content elements may be selected as being of interest to the particular user who is reading the document.

A graphical representation of the selected content elements may be included in the visual summary. For example, each of the content elements may be associated with (an element of) a graph, such as a bar graph or pie graph, which visually indicates a relative importance of the different content elements. In this way, the user may quickly grasp a meaning and/or subject matter of the content, simply by glancing at the visual summary.

The visual summary generator 104 generates the visual summary by identifying the content elements, and associating the identified content elements with a graphical representation. In identifying the content elements, the visual summary generator 104 may first perform enhancement of the document 102 using a metadata enhancer 108.

The metadata enhancer 108 may be used to particularly identify words, numbers, or other content characters/elements within the document 102. The content elements could be identified by, for example, matching elements within the content to a pre-determined list of elements. As another example, the metadata enhancer 108 may have the ability to analyze content for types of information, such as examining content for numbers in the form xxx-xx-xxxx, and identifying each content element as a social security number. Other techniques could also be used for selecting content elements from within the content of the document 102.

Such content metadata may be referred to herein by a number of terms, such as metadata, content elements, objects, or discussion objects. In general, "discussion objects" are considered to be conceptual objects that are mentioned (discussed) as part of the document 102. Similarly, "discussion classes" are considered to be types, or categories, of discussion objects. For example, a document about a discussion class of "computer manufacturers" may mention the discussion object "Hewlett Packard" many times, while only mentioning the discussion object "Dell" infrequently.

It should be understood that a discussion object within a document or media asset may represent more than the literal representation of a particular word. For example, a discussion object "America" may be associated with various terms determined to have similar meanings, such as "U.S.," or "United States". By analyzing and considering information conveyed by, or with respect to, such content metadata, the visual summary generator 104 is able to provide the visual summary 106.

More specifically, once the document 102 has been enhanced such that content elements (or discussion objects) have been identified therein the visual summary generator 104 applies content-summarizing logic 110 to the document 102. The content-summarizing logic 110 considers all of the identified content elements/discussion objects, and selects some predetermined number thereof to be included in the visual summary 106. The content-summarizing logic 110 may include (or have access to) a user preference database (not shown) for accessing user preference information. Different types of content-summarizing logic are discussed in more detail below.

Once the content elements have been identified, and some subset thereof has been selected for inclusion in the visual summary 106, a metadata presentation system 112 compiles this information, and presents the visual summary 106. This presentation may include various functions, such as, for example, determining a size and placement of a section, window, or frame for containing the visual summary 106 within a user display and generating a graphical representation as part of the visual summary 106. The metadata presentation system 112 also may distinguish the content elements within the document 102, as presented to the user, by, for example, highlighting the content elements within the document 102 as the document 102 is displayed. In this way, the user may quickly locate a content element that is of particular interest.

In short, the ability to extract and present discussion objects or other content elements enables a technique for presenting a visual summary or snapshot of content of a document or other media asset. For example, the metadata presentation system 112 may select particular discussion objects from among all of the discussion objects within the document 102. For example, the metadata presentation system 112 may select the five discussion objects which appear most frequently within the document, or may select discussion objects which are already known to be of importance to the user. A ranking (based on some pre-determined criteria) of these selected discussion objects may be illustrated graphically, so that the user sees immediately which terms are included within the document, as well as which of these terms are most important and/or relevant to the content of the document 102. Such a graphically-based document summary may allow the user to grasp a meaning of the document 102 very quickly and easily.

It should be understood that some or all of the functionality of the visual summary generator 104 may be performed on a server computer, where the server computer may provide the document to the user across a computer network, such as a Wide Area Network (WAN) (including the Internet), or a Local Area Network (LAN) (such as an enterprise network). Alternatively, some or all of the functionality of the visual summary generator 104 may be performed at a local computer of the user.

The content-summarizing logic 110 may include techniques for empirical or statistical analysis of the content of the document 102. Additionally, or alternatively, the content-summarizing logic 110 may include preference information related to the user, or related to a group of users of which the user is a part.

As just mentioned, these and other types of content-summarizing logic may be implemented (in whole or in part) remotely or locally. For example, preference information related to the user may be stored and used locally, and changes to the preference information (which may be updated or modified in various manners, such as, for example, those described herein) also may be stored locally. Similarly, metadata enhancement and presentation within (or with respect to) a particular document may be performed on the client side, and may be performed on media assets stored locally and/or obtained via a computer network.

Figure 2:
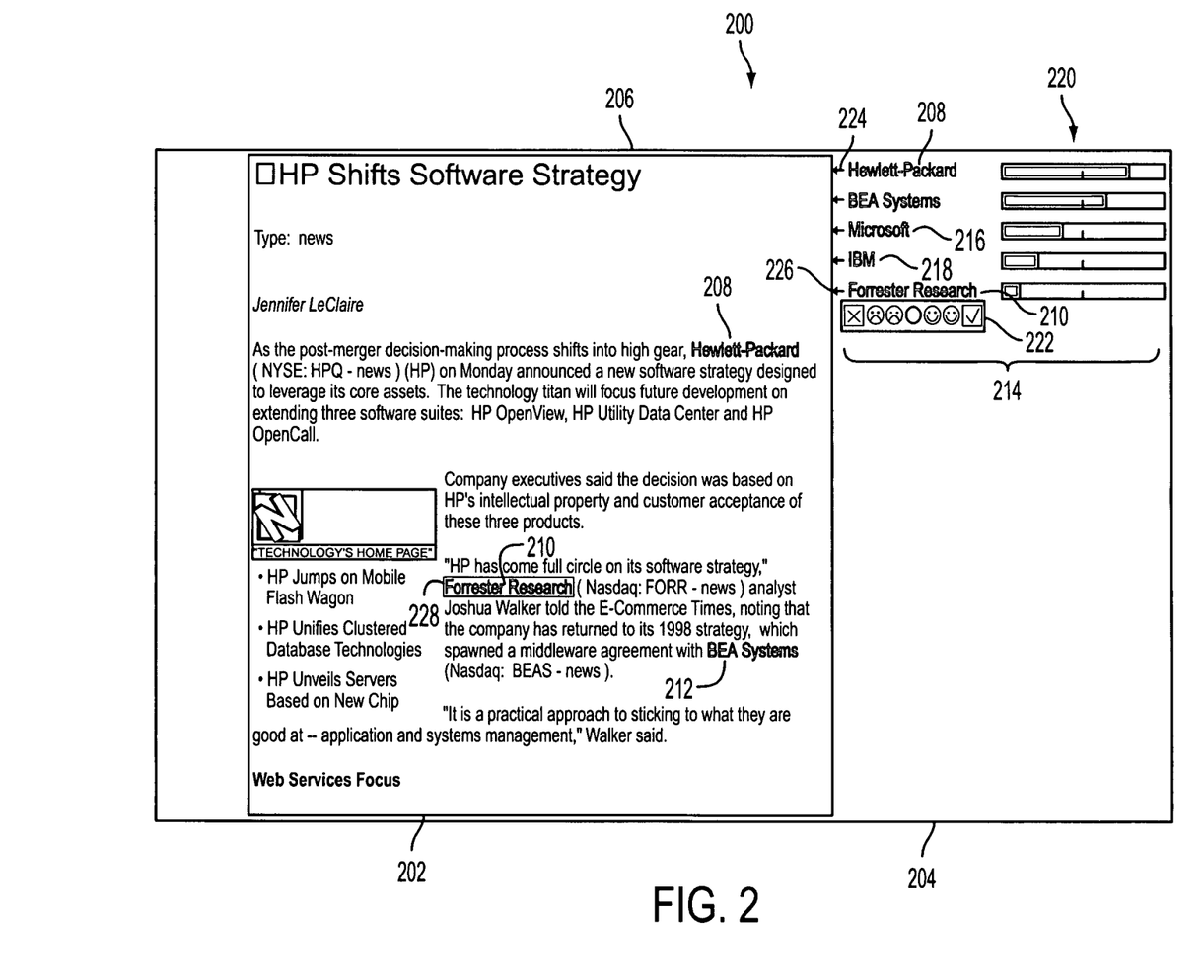
FIG. 2 is a screen shot illustrating an implementation of a visual summary.

FIG. 2 is a screen shot 200 illustrating an implementation of a visual summary 106. In FIG. 2, the screen shot 200 includes a first section 202 and a second section 204. The first section 202 displays an article, also referred to as a document, 206. In the document 206, content elements or discussion objects have been identified, including a discussion object 208 "Hewlett-Packard," a discussion object 210 "Forrester Research," and a discussion object "BEA Systems" 212. In the screen shot 200, the discussion objects are distinguished by highlighting; however, the discussion objects could be distinguished by an number of techniques, including underlining, bolding, or alternate coloring.

In the second section 204, a visual summary 214 of the document 206 is provided. Specifically, discussion objects from within the document 206 are displayed, including the discussion objects already mentioned, and a discussion object 216 "Microsoft", a discussion object 218 "IBM" ("International Business Machines"). Also, a plurality of relative importance indicators 220 are displayed beside each discussion object.

In the screen shot 200, the importance indicators 220 are bar graphs which are each partially shaded, to a degree indicating a relative importance of a particular discussion object to the document 206 (or to the user). Also, the discussion objects are arranged in order from most important to least important with respect to the document 206 (or the user). In this way, a user may determine a subject matter of the document 206 immediately upon seeing the information within the second portion 204 of the screen shot 200.

In screen shot 200, the user is able to express preference information about any one of the discussion objects within the second section 204, as demonstrated by a pop-up window 222. This preference information may be user later by the content-summarizing logic 110 in identifying elements for inclusion in the visual summary 106. Techniques associated with the pop-up window 222 used for collecting user preferences are discussed in the commonly-assigned applications (i) U.S. application Ser. No. 10/231,440, filed Aug. 30, 2002, and titled "Dynamic Presentation of Personalized Content", (ii) U.S. application Ser. No. 10/231,459, filed Aug. 30, 2002, and titled "Rich Media Information Portals," and (iii) U.S. application Ser. No. 10/354,144, filed Jan. 30, 2003, and titled "Interface for Collecting User Preferences,"

all three of which are hereby incorporated by reference. In other implementations, discussion objects within the second section 204 are included as simple text/graphics, solely for the purpose of providing the visual summary, and not for collecting preference information.

Discussion objects may be selected from the document 206 for inclusion within the visual summary 214 by a variety of techniques. For example, all of the discussion objects within the document 206 may be selected and ranked, or only a fraction of the discussion objects may be selected and ranked. Alternatively, all of the discussion objects may be ranked, and then some subset (for example, the top five) of the most highly-ranked discussion objects may be displayed in the visual summary 214.

Ranking and/or assigning an importance level to each of the discussion objects also may be performed by a variety of techniques. For example, the discussion objects may be ranked simply according to a number of times that each discussion object appears within the document 206. As another example, discussion objects which appear within a title, picture caption, first/last paragraph, or other prominent location within the document 206 may be ranked more highly. As a final example, discussion objects which are strongly preferred by a user may be given preference over other discussion objects, even if the preferred discussion objects do not appear as frequently, or as prominently, as the other discussion objects. Of course, any combination of these and other ranking techniques also may be used.

Additionally, an arrow 224 or other marker may be provided along with each of the various discussion objects, where the function of the arrow 224 is to take the user directly to the associated discussion object within the context of the document 206. For example, if the user were to select (for example, click on) the arrow 224, the user would be consecutively taken to each of the various instances of the discussion object 208 "Hewlett-Packard" within the document 206. As another example, clicking on the arrow 224 might particularly highlight all instances of the discussion object 208 "Hewlett-Packard" within the document 206, so that the user may easily detect the various instances when scrolling through the document 206.

In the particular example of FIG. 2, the user has clicked on an arrow 226 associated with the discussion object 210 "Forrester Research." Thus, a box 228 has been provided around an occurrence of the discussion object 210 "Forrester Research" in a body of the document 206. Of course, a discussion object selected by virtue of one of the arrows 224 may be distinguished by any number of techniques other than using the box 228. For example, the discussion object may be highlighted, colored, underlined, or bolded, to name just a few examples.

Figure 3:
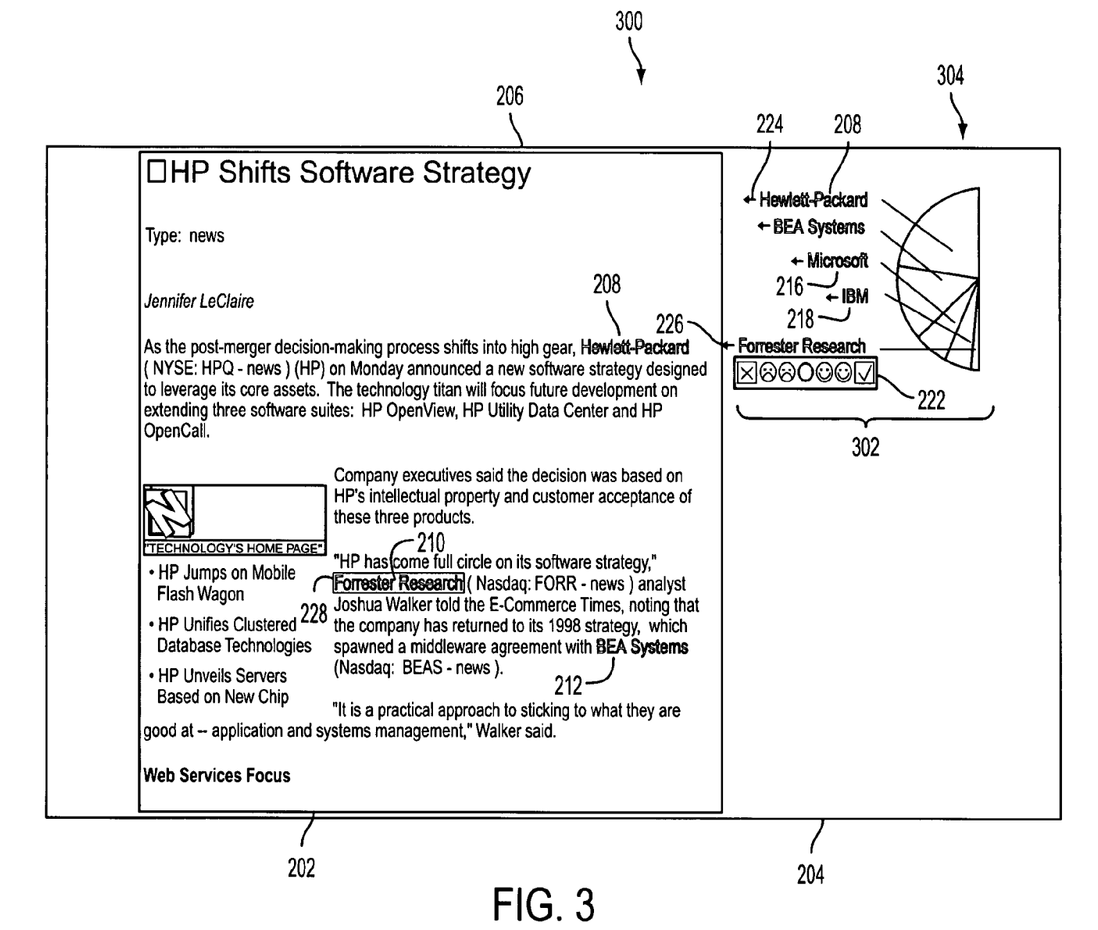
FIG. 3 is a screen shot illustrating a second implementation of a visual summary.

FIG. 3 is a screen shot 300 illustrating another implementation of a visual summary, showing a visual summary 302. In the screen shot 300, the visual summary 302 is provided similarly to that of screen shot 200, using various discussion objects 208, 210, 212, 216, and 218. However, the relative importance of each of the discussion objects is indicated in screen shot 300 not by a set of associated bar graphs, but rather by a pie-chart 304. In the pie-chart 304, by definition of a pie-chart, the importance of all of the selected discussion objects adds up to 100%, so that a relative importance of each discussion object is, in relative percentage terms, less than is indicated in the bar graphs 220. For example, the discussion object 208 "Hewlett-Packard" in the bar graphs 220 has a relative importance of approximately 80%, whereas the same discussion object is assigned only about 45% in the pie-chart 304.

Figure 4:
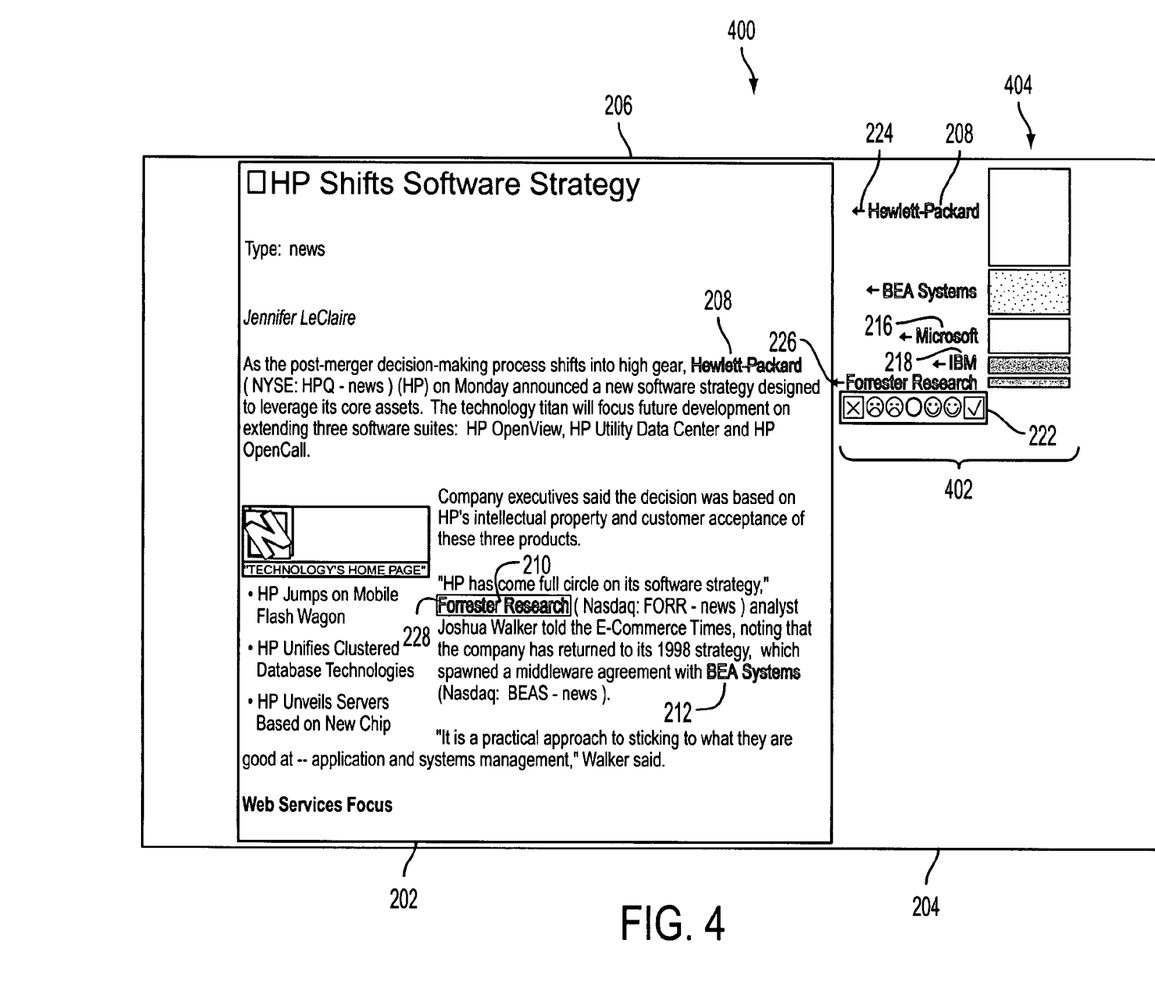
FIG. 4 is a screen shot illustrating a third implementation of a visual summary.

FIG. 4 is a screen shot 400 with a third implementation of a visual summary, as shown in a visual summary 402. In screen shot 400, the visual summary 402 of the document 206 is provided using multiple discussion objects. In the screen shot 400, however, the relative importance of each discussion object is indicated using a gradient graph 404. Specifically, a different size and/or color is given to each of the discussion objects to indicate its relative importance within the document 206 (illustrated as shades of gray in FIG. 4). In the case where color is the only importance indicator, a legend could be included indicating an importance level associated with each color or shade of color.

Figure 5:
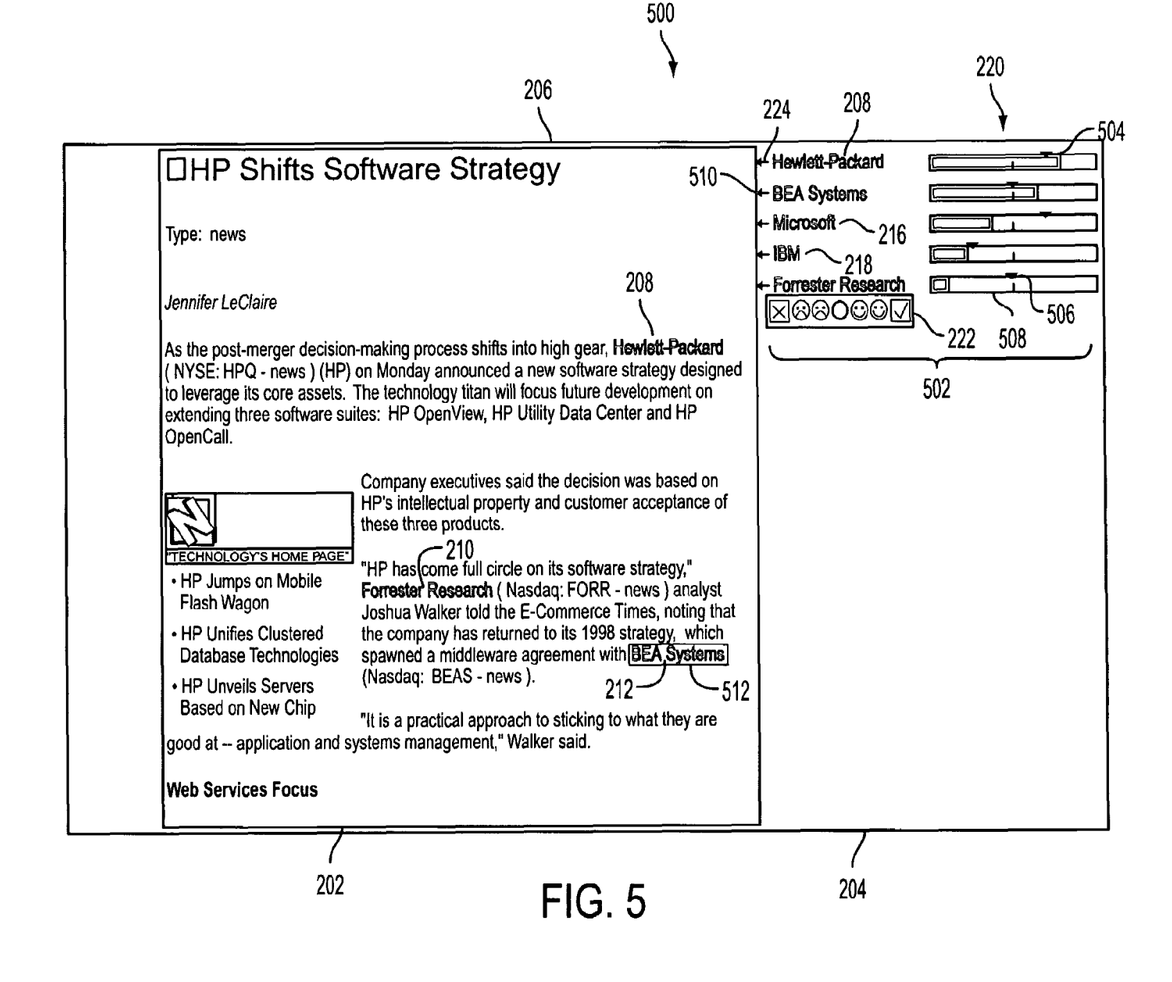
FIG. 5 is a screen shot illustrating a fourth implementation of a visual summary.

FIG. 5 is a fourth screen shot 500 illustrating a visual summary 502. FIG. 5, similarly to the screen shot 200 in FIG. 2, provides the bar graphs 220, where each of the multiple bar graphs 220 is associated with a discussion object from within the document 206, and filled in proportionally to an importance level of the associated discussion object.

In the screen shot 500, however, additional information is provided. Specifically, arrows 504 are provided along with the bar graphs 220. The arrows 504 are meant to indicate a user preference, as opposed to a relative importance of the discussion object within the document 206. For example, the user has provided a "neutral" preference regarding the discussion object 210 "Forrester Research," using the pop-up window 222. Therefore, an arrow 506 indicates this information about the user's preference in the context of a bar graph 508 associated with the discussion object 210 "Forrester Research." Thus, user preference information can be used independently of, as well as in conjunction with, relative importance information, in order to generate a visual summary such as the visual summary 502.

In one implementation, any one of the arrows 504 may be movable along its associated one of the bar graphs 220. In this way, the user may move a selected arrow to the left or right along its bar graph, to thereby indicate lesser or greater interest in the associated discussion object. This technique for inputting user preferences may be in addition to, or an alternative to, the inputting of user preferences using the pop-up window 222.

Also in FIG. 5, it should be noted that an arrow 510, associated with the discussion object 212 "BEA Systems" within the visual summary 502, has been selected by the user. Thus, a box 512 has been placed around an occurrence of the discussion object "212" BEA Systems, thereby indicating a presence of that discussion object, within a context of the document 206, to the user. As mentioned above, the user may be taken to each further instance of the discussion object "212" BEA Systems within the document 206 by continually clicking on the arrow 510. In another implementation, a box such as the box 512 may be presented simultaneously around each instance of the discussion object "212" BEA Systems, so that the user's attention is appropriately drawn as the user scrolls through the document 206. Of course, a discussion object selected by virtue of one of the arrows 224 may be distinguished by any number of techniques other than using the box 512. For example, the discussion object may be highlighted, colored, underlined, or bolded, to name just a few examples.

Figure 6:
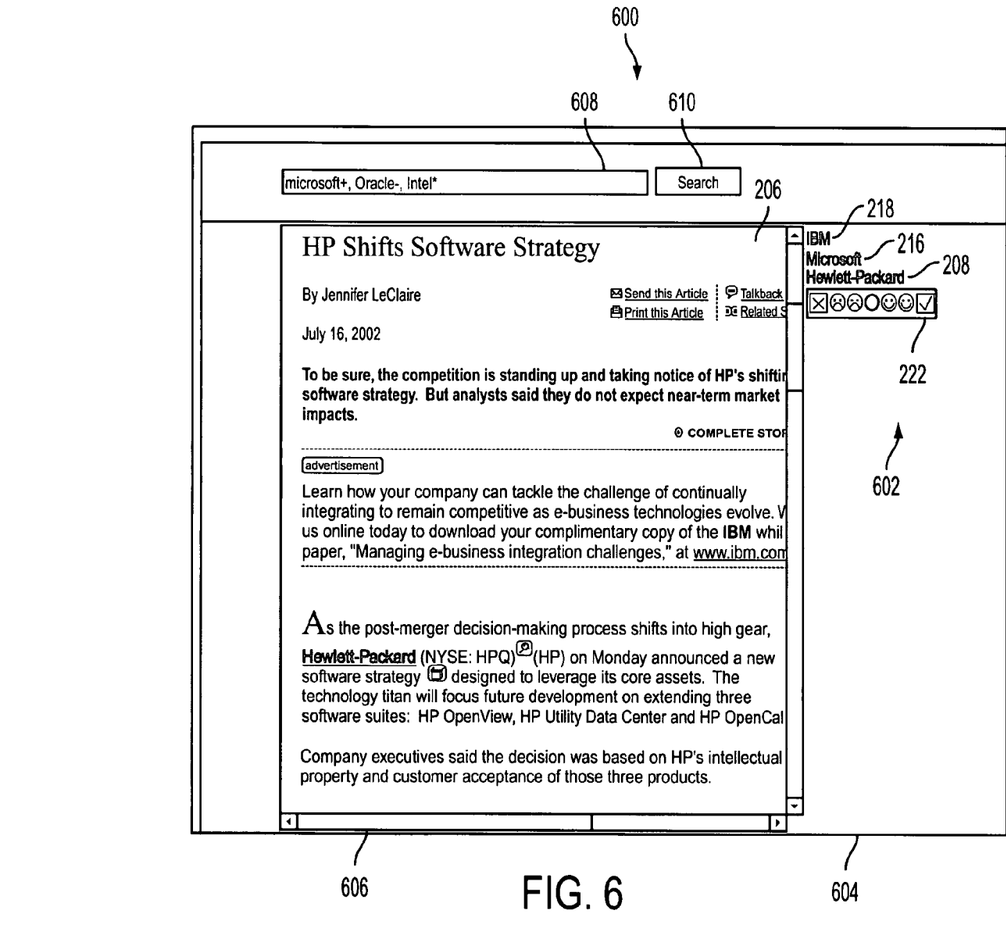
FIG. 6 is a screen shot illustrating a fifth implementation of a visual summary.

FIG. 6 is a fifth screen shot 600 illustrating a visual summary 602. In screen shot 600, an original, un-enhanced version of the document 206 is displayed, that is, the discussion objects associated with the document 206 are not displayed within the context of the document 206 itself. Instead, some of the discussion objects are provided to the user within a reserved portion 604 of the screen shot 600, such as, for example, within the visual summary 602. Within portion 604, the discussion object 216 "Microsoft," the discussion object 208 "Hewlett-Packard," and a discussion object 218 "IBM" are displayed as the visual summary 602. In screen shot 600, the original version of the document 206 is displayed to the user by directing the user to a remote location of the document 206, using a frame 606.

In screen shot 600, the visual summary generator 104 is thus displaying an original version of the document 206, where either the visual summary generator 104 and/or the document 206 is part of a server computer. In this case, the document 206 is an HTML document, and is displayed within the frame 606, which may display the document 206 by obtaining it directly from a remote location, or by obtaining the document 206 from a local database. In any case, in screen shot 600, the visual summary generator 104 has not altered the original version of the document 206, but rather has determined discussion objects within the document 206 for display within the portion 604 as the visual summary 602. In screen shot 600, the discussion objects may be determined using, for example, the metadata enhancer 108, or another metadata enhancer (not shown), such as a metadata enhancer external to the visual summary generator 104.

In short, when the document 206 is shown in its original version, its summary content elements within the visual summary 602 may be exclusively presented externally to the document, and need not be additionally presented within the content of the document 206 itself.

Also in the screen shot 600, the document 206 is presented as part of a search result, as indicated by a search string in a section 608, and by a search button 610. Thus, as referred to above, the visual summary 106 may be used in a variety of settings, including search engines (as in FIG. 6), user-personalized portal pages, electronic mail messages, and other situations in which the user is electronically presented with information.

Figure 7:
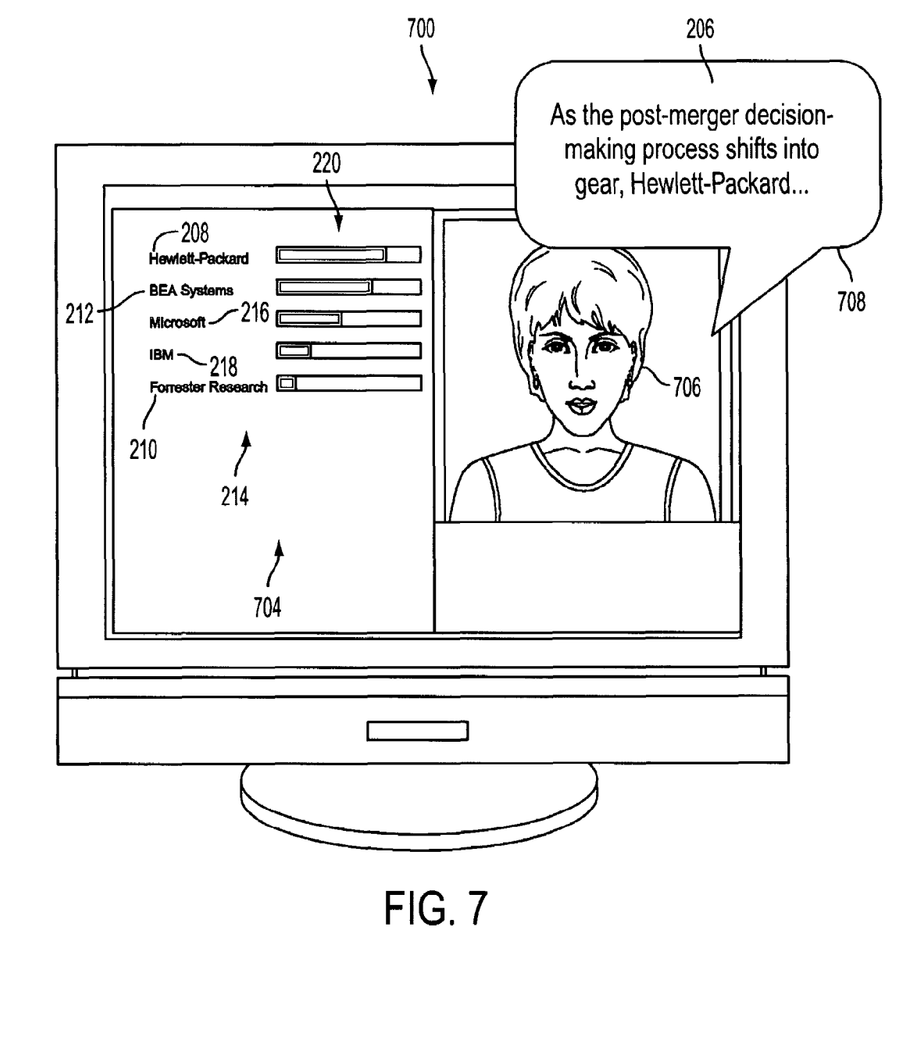
FIG. 7 is a screen shot illustrating a sixth implementation of a visual summary.

FIG. 7 is a sixth screen shot 700 illustrating a visual summary 702. In FIG. 7, the screen shot 700 includes a first portion 702 and a second portion 704. In the first portion 702, a narrator 706 is reading the document 206 (indicated by a word bubble 708) as part of an audio-video presentation. In the second portion 704, the visual summary 214 of screen shot 200 of FIG. 2 is shown, illustrating the point that such a visual summary may be used in conjunction with any number of types of media assets.

In various implementations described above, specific discussion objects (content elements) may be selected from the content of a document or other media asset, and displayed as a visual summary within a reserved portion of a user display. A graphical representation of the content elements may be included with the visual summary, indicating, for example, an importance of the content elements within the media asset, relative to one another, a user preference, or some other criterion. In this way, a visual summary of the content of the media asset may be made available to the user, so that the user may quickly and easily assess his or her level of interest in the media asset.

A number of implementations have been described. Nevertheless, it will be understood that various modifications may be made. Accordingly, other implementations are within the scope of the following claims.

What is claimed is:

1. A method comprising:
   obtaining a media asset, the media asset including content;
   applying content-summarizing logic to the content, to thereby select a plurality of summary elements from within the content;
   displaying the media asset in a first portion of a user display;
   displaying the summary elements within a second portion of the user display such that the summary elements can be viewed simultaneously with viewing at least a portion of the content of the media asset;
   displaying, in the second portion of the user display, multiple selectable indicators for enabling a user to select one of multiple preference strengths for a summary element such that selection of a particular selectable indicator is operable to associate a particular preference strength with the summary element; and
   storing the association of the particular strength with the summary element for later use in applying the content-summarizing logic.

2. The method of claim 1 wherein applying content-summarizing logic to the content comprises comparing words within the content to a pre-determined list of summary elements.

3. The method of claim 1 wherein:
   the summary elements include individual discussion objects selected from the content, and
   further wherein the discussion objects are individually classified in a pre-determined manner.

4. The method of claim 1 wherein displaying the summary elements comprises associating a graphical representation of the summary elements with the summary elements, within the second portion of the user display.

5. The method of claim 4 wherein associating the graphical representation comprises:
   associating a bar graph with each of the summary elements; and
   increasing a size of the bar graph in proportion to an importance of the bar graph's corresponding summary element.

6. The method of claim 4 wherein associating the graphical representation comprises:
   associating a portion of a pie graph with each of the summary elements; and
   increasing a size of the portion in proportion to an importance of the portion's corresponding summary element.

7. The method of claim 4 wherein associating a graphical representation comprises:
   associating a colored object with each of the summary elements; and
   altering a color of the colored object in proportion to an importance of the colored object's corresponding summary element.

8. The method of claim 4 wherein associating the graphical representation comprises associating a first preference-strength indicator with a first summary element using the graphical representation, the first preference-strength indicator indicating a strength of a user's preference for the first summary element.

9. The method of claim 1 wherein applying content-summarizing logic to the content further comprises:
   determining a level of importance of each of the summary elements; and
   indicating the level of importance of each element within the second portion of the user display.

10. The method of claim 9 wherein determining the level of importance comprises determining a frequency of appearance of the summary element within the content.

11. The method of claim 9 wherein determining the level of importance comprises determining a prominence of appearance of the summary element within the content.

12. The method of claim 9 wherein indicating the level of importance comprises displaying the summary elements in order according to their respective levels of importance.

13. The method of claim 9 wherein applying content-summarizing logic to the content further comprises:
accessing user preference information to determine a level of user preference of each of the summary elements; and
selecting the summary elements based on the user preference information.

14. The method of claim 13 wherein selecting the summary elements is further based on a criteria other then the user preference information.

15. The method of claim 13 wherein applying content-summarizing logic to the content further comprises:
combining the level of user preference and the level of importance into a selection value; and
ranking the summary elements based on the selection value.

16. The method of claim 1 further comprising:
accessing user preference information to determine a relative level of importance of each of the summary elements to a user; and
selecting the summary elements based on the user preference information.

17. The method of claim 1 wherein displaying the summary elements comprises providing a link from a first summary element displayed in the second portion of the user display to an appearance of the first summary element within the content within the first portion of the user display.

18. A user display system comprising:
a first portion configured to display a media asset, the media asset including content; and
a second portion configured to display:
summary elements selected from the content in accordance with content-summarizing logic such that the summary elements can be viewed simultaneously with viewing at least a portion of the content of the media asset, and
multiple selectable indicators for enabling a user to select one of multiple preference strengths for a summary element such that selection of a particular selectable indicator is operable to store an association of a particular preference strenght with the summary element for later use in applying the content-summarizing logic.

19. The system of claim 18 wherein the content-summarizing logic includes rules for comparing words within the content to a pre-determined list of summary elements.

20. The system of claim 18:
wherein the summary elements include individual discussion objects selected from the content, and
further wherein the discussion objects are individually classified in a pre-determined manner.

21. The system of claim 18 wherein the second portion is further operable to display a graphical representation of the summary elements.

22. The user display of claim 21 wherein the content-summarizing logic includes rules for:
determining a level of importance of each of the summary elements; and
indicating the level of importance of each element within the second portion of the user display.

23. An apparatus comprising a storage medium having instructions stored thereon, the instructions including:
a first code segment for partitioning a user display into a first portion and a second portion;
a second code segment for displaying a media asset within the first portion, the media asset including content;
a third code segment for selecting a group of individual elements from the content;
a fourth code segment for displaying the group of elements within the second portion such that the group of elements can be viewed simultaneously with viewing at least a portion of the content of the media asset; and
a fifth code segment for displaying, within the second portion of the user display; multiple selectable indicators for enabling a user to select one of multiple preference strenghts for a summary element such that selection of a particular selectable indicator is operable to store an association of a particular preference strength with the summary element for later use applying the content-summarizing logic.

24. The apparatus of claim 23 wherein the third code segment includes a fifth code segment for comparing words within the content to a pre-determined list of individual elements.

25. The apparatus of claim 23 wherein the individual elements include individual discussion objects selected from the content, and further wherein the discussion objects are individually classified in a predetermined manner.

26. The apparatus of claim 23 wherein the third code segment includes:
a fifth code segment for determining a first set of elements from within the content; and
a sixth code segment for selecting the group of elements from among the first set of elements.

27. The apparatus of claim 26 wherein the sixth code segment selects the group of elements based on a relative importance of each element within the group of elements to the content of the media asset.

28. A computer program product tangibly embodied in a computer readable medium, the computer program product including instructions that, when executed, generate a graphical user interface on a display device, the computer program product being configured to:
obtain a media asset, the media asset including content;
apply content-summarizing logic to the content, to thereby determine plurality of summary elements from within the content;
access user preference information stored in a computer storage medium, the user preference information comprising a level ot user preference for a summary element;
determine a level of user preference for one or more of the determined summary elements based on the accessed user preference information;
display the media asset in a first portion of the graphical user interface;
display one or more of the determined summary elements within a second portion of the graphical user interface such that the displayed summary elements can be viewed simultaneously with viewing at least a portion of the content of the media asset;
display a first preference-strenght indicator in association with one or more of the displayed summary elements within the second portion of the graphical user interface, the first preference-strength indicator indicating a level of user preference for the associated displayed summary elements; and display, in the second portion of the user display, multiple selectable indicators for enabling a user to select one of multiple preference strengths for a summary element such that selection of a particular selectable indicator is operable to associate a particular preference strength with the summary element.

29. The computer program product of claim 28 further configured to display one or more of the determined summary elements in order according to their respective levels of user preference.

30. The computer program product of claim 28 further configured to determine the plurality of summary elements from within the content based on the accessed user preference information.

* * * * *